United States Patent
Sato

(10) Patent No.: US 8,629,920 B2
(45) Date of Patent: Jan. 14, 2014

(54) IMAGE CAPTURE APPARATUS

(75) Inventor: Yoichi Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 12/435,634

(22) Filed: May 5, 2009

(65) Prior Publication Data

US 2009/0278980 A1    Nov. 12, 2009

(30) Foreign Application Priority Data

May 7, 2008  (JP) ................................. 2008-120886

(51) Int. Cl.
*H04N 5/76*   (2006.01)
*H04N 5/225*  (2006.01)

(52) U.S. Cl.
USPC ........................................ 348/231.1; 348/372

(58) Field of Classification Search
USPC .............................................. 348/231.1, 372
See application file for complete search history.

(56) References Cited

U.S. PATENT DOCUMENTS

| 7,157,880 B2 * | 1/2007 | Kubota | 320/106 |
| 7,449,863 B2 * | 11/2008 | Tashiro | 320/112 |
| 2004/0185913 A1 * | 9/2004 | Aoshima et al. | 455/566 |
| 2005/0062878 A1 * | 3/2005 | Ogawa et al. | 348/372 |
| 2007/0285056 A1 * | 12/2007 | Yoon et al. | 320/116 |
| 2008/0158390 A1 * | 7/2008 | Chuang | 348/231.99 |
| 2009/0115852 A1 * | 5/2009 | Jung et al. | 348/207.1 |

FOREIGN PATENT DOCUMENTS

| JP | 2004-038029 A | 2/2004 |
| JP | 2004-134145 A | 4/2004 |
| JP | 2004-294723   | 10/2004 |

* cited by examiner

*Primary Examiner* — Timothy J Henn
*Assistant Examiner* — Pritham Prabhakher
(74) *Attorney, Agent, or Firm* — Cowan, Liebowitz & Latman, P.C.

(57) ABSTRACT

An image capture apparatus connects to a first battery unit and a second battery unit. The image capture apparatus includes a counting unit and a calculation unit. The counting unit counts the number of shots (PN). The calculation unit divides the number of shots (PN) to PN1 and PN2 based on a first battery consumption and a second battery consumption. The PN1 represents the number of shots allotted to the first battery unit, and the PN2 represents the number of shots allotted to the second battery unit. The first battery consumption represents a consumption of the first battery unit, and the second battery consumption represents a consumption of the second battery unit.

16 Claims, 5 Drawing Sheets

IMAGE CAPTURE APPARATUS

BACKGROUND OF THE INVENTION

1. Field of the Invention

The present invention relates to an electronic apparatus (e.g. an image capture apparatus) that displays information relating to a battery.

2. Description of the Related Art

There is known a digital camera that displays the remaining capacity of a battery unit, and the number of shots or releases (Japanese Patent Laid-Open No. 2004-294723). In such a digital camera, the number of shots is usually displayed on a display unit of a camera body. The battery unit has a battery and a memory, and the memory stores the number of shots. The number of shots is written to the memory by a system control circuit of an image capture part in the digital camera. Both the system control circuit and the image capture part are provided in the camera body. FIG. 6 is a block diagram showing a relationship among one battery unit 1, a system control circuit 3, and an image capture part 7 in a camera body.

A battery accessory provided with a plurality of battery units so as to enhance the power is also known. FIG. 7 shows one example of this battery accessory. A battery accessory 2 has two battery units 1a and 1b, and two diodes 4a and 4b. The diodes 4a and 4b are provided, for example, so as to prevent the power supply from the battery unit 1a to the battery unit 1b. This battery accessory 2 can simultaneously supply the powers from the two battery units when the two battery units have identical voltages, but when two battery units have different voltages, the power is supplied only from the battery unit having a larger voltage.

Since the image capture part 7 and the battery unit 1 have a one-to-one relationship in the structure shown in FIG. 6, the system control circuit 3 can obtain the number of shots from the image capture part 7 and write the number of shots to the memory in the battery unit 1. On the other hand, since the image capture part 7 and the battery units 1a and 1b have a one-to-two relationship in the structure shown in FIG. 7, the system control circuit 3 cannot distribute the number of shots obtained from the image capture part 7 to the battery units 1a and 1b.

SUMMARY OF THE INVENTION

The present invention is directed to overcome the above-described drawbacks and disadvantages.

The present invention is, for example, directed to provide an electronic apparatus (e.g. an image capture apparatus) that can distribute the number of shots to a plurality of battery units.

An image capture apparatus according to one aspect of the present invention connects to a first battery unit and a second battery unit. The image capture apparatus includes a counting unit and a calculation unit. The counting unit counts the number of shots (PN). The calculation unit divides the number of shots (PN) to PN1 and PN2 based on a first battery consumption and a second battery consumption. The PN1 represents the number of shots allotted to the first battery unit, and the PN2 represents the number of shots allotted to the second battery unit. The first battery consumption represents a consumption of the first battery unit, and the second battery consumption represents a consumption of the second battery unit.

Further features and aspects of the present invention will become apparent from the following description of exemplary embodiments with reference to the attached drawings.

DESCRIPTION OF THE EMBODIMENTS

Various exemplary embodiments, features, and aspects of the present invention will now be described in detail below with reference to the attached drawings.

A description will be given of an image capture apparatus as one example of an electronic apparatus according to the present invention, but the present invention is applicable to any electronic apparatuses that operate with secondary batteries. The image capture apparatus of this embodiment is, for example, an electronic camera (digital camera).

Figure 1:
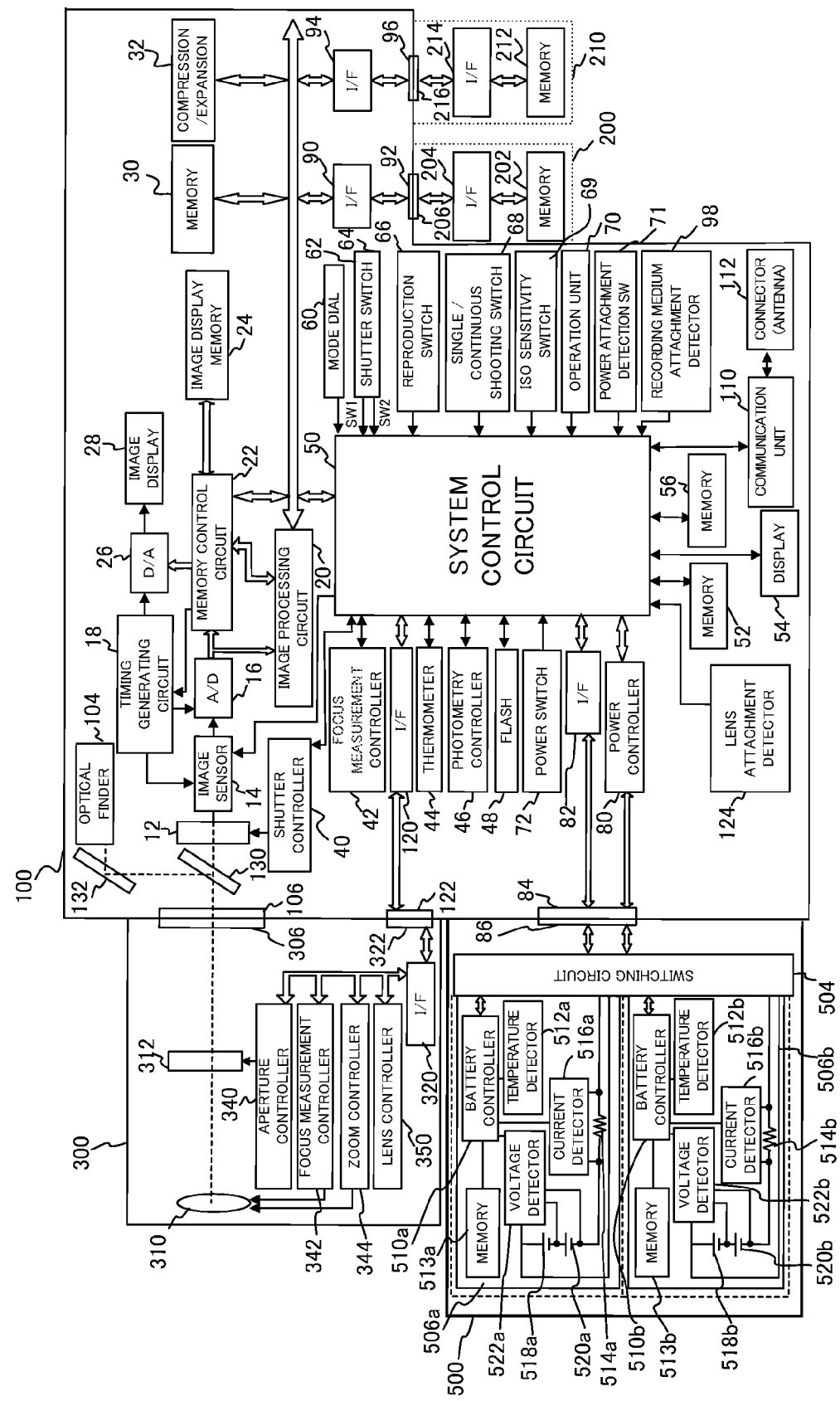
FIG. 1 is a block diagram showing a structure of an image capture apparatus as one example of an electronic apparatus.

FIG. 1 is a block diagram showing a structure of the electronic camera. The electronic camera includes a camera body 100 as a body of the electronic camera, and a battery accessory 500 which can be attached to and detached from the body. The body 100 is supplied with powers in parallel by at least one of battery units 506a and 506b of the battery accessory 500.

Reference numeral 12 denotes a shutter configured to control an exposure dose of an image sensor 14 that converts an optical image into an electric signal. A ray incident upon a photography lens 310 in a lens unit 300 forms an optical image on the image sensor 14 led by the single-lens reflex system through an aperture 312, lens mounts 306 and 106, and the shutter 12.

Reference numeral 16 denotes an A/D converter that converts an analog signal output from the image sensor 14 into a digital signal. Reference numeral 18 denotes a timing generating circuit that supplies a clock signal and a control signal to the image sensor 14, the A/D converter 16, and a D/A converter 26, and is controlled by a memory control circuit 22 and a system control circuit 50.

Reference numeral 20 denotes an image processing circuit configured to provide a pixel interpolation process and a color conversion process for image data from the A/D converter 16 or data from the memory control circuit 22. The image processing circuit 20 provides a necessary operation process with captured image data, and the system control circuit 50 provides a variety of processes to control an (exposure) shutter controller 40 and a focus measurement controller 42 based on the obtained operation result. These processes include an autofocus ("AF") process of a through-the-lens ("TTL") system, an auto exposure ("AE") process, and an EF (flash pre-emission) process. Moreover, the image processing circuit 20 provides an operation process using captured image data, and an auto white balance ("AWB") of the TTL system based on the obtained operation result.

The system control circuit 50 serves as a counting unit configured to count the number of shots the battery units 506a and 506b supply the power to the camera body 100 in parallel. This embodiment provides the focus measurement controller 42 and a photometry controller 46. Therefore, the system control circuit 50 can provide such processes as the AF process, the AE process, and the EF process using the focus measurement controller 42 and the photometry controller 46. Alternatively, the system control circuit 50 may provide such processes as the AF process, the AE process, and the EF process using the image processing circuit 20.

Such processes as the AF process, the AE process, and the EF process may be provided by the focus measurement controller 42 and the photometry controller 46. In addition, such processes as the AF process, the AE process, and the EF process may be provided by the image processing circuit 20.

Reference numeral 22 denotes the memory control circuit configured to control the A/D converter 16, the timing generating circuit 18, the image processing circuit 20, an image display memory 24, the D/A converter 26, a memory 30, and a compression/expansion circuit 32.

Data from the A/D converter 16 is written to the image display memory 24 or the memory 30 via the image processing circuit 20 and the memory control circuit 22 or directly via the memory control circuit 22.

Reference numeral 24 denotes the image display memory, and reference numeral 26 denotes the D/A converter. Reference numeral 28 denotes an image display including a TFT-LCD. The image data for display written to the image display memory 24 is displayed by the image display 28 via the D/A converter 26. An electronic finder function can be implemented in sequentially displaying captured image data on the image display 28. The image display 28 displays not only various setting information but also the remaining capacity of the battery in addition to the image data. In displaying the remaining capacity of the battery, the system control circuit 50 generates data, writes the data to the image display memory 24 via the memory control circuit 22, and then displays the image via the D/A converter 26. The image display 28 can arbitrarily turn on and off the display by command of the system control circuit 50, and turning off of the display can significantly reduce a power consumption of the camera body 100.

Reference numeral 30 denotes the memory, which stores photographed still images and moving images, and has a capacity enough to store the predetermined number of still images and the moving images for a predetermined time period. Thereby, in panoramic shooting or continuous shooting that continuously shoots a plurality of still images, quick and extensive images can be written to the memory 30. The memory 30 can be used as an operation area of the system control circuit 50.

Reference numeral 32 denotes the compression/expansion circuit, which compresses or expands image data using an adaptive discrete cosine transform ("ADCT"), etc., reads image data stored in the memory 30, performs a compression process or an expansion process for it, and writes the processed image data to the memory 30.

Reference numeral 40 denotes the shutter controller, which controls the shutter 12 based on the photometric information from the photometry controller 46 in association with an aperture controller 340 that controls the aperture 312. Reference numeral 42 denotes the focus measurement controller for the AE process. The focus measurement controller 42 introduces a ray incident upon the photography lens 310 in the lens unit 300 by a single-lens reflex manner via the aperture 312, the lens mounts 306 and 106, a mirror 130, and an AF sub-mirror (not shown), thereby measuring the formed on-focus state of an optical image.

Reference numeral 44 denotes a thermometer configured to detect a surrounding temperature in a photography environment. When the thermometer 44 is located in the image sensor 14, the sensor's dark current can be precisely predicted.

Reference numeral 46 is the photometry controller for the AE process. The photometry controller 46 introduces a ray incident upon the photography lens 310 in the lens unit 300 by a single-lens reflex manner via the aperture 312, the lens mounts 306 and 106, the mirror 130, and a photometric sub-mirror (not shown), thereby measuring an exposure state of the formed optical image. The photometry controller 46 also serves to provide an EF process in association with a flash unit 48. Reference numeral 48 denotes the flash unit, which has a light projection function and EF function of the AF auxiliary light.

The system control circuit 50 can provide an exposure control and an AF control using the video TTL method for the shutter controller 40, the aperture controller 340, and a focus measurement controller 342 based on an operation result operated by the image processing circuit 20.

Moreover, the AF control may be provided by using both the measurement result by the focus measurement controller 42 and the operation result operated by the image processing circuit 20 of the image data captured by the image sensor 14. In addition, the exposure control may be provided by using both the measurement result by the photometry controller 46 and the operation result operated by the image processing circuit 20 of the image data captured by the image sensor 14.

Reference numeral 50 denotes the system control circuit configured to control the entire camera body 100, and has a known CPU, etc. Reference numeral 52 denotes a memory configured to store constants, variables, and programs for operations of the system control circuit 50. Reference numeral 54 denotes a display that has a liquid crystal display, a speaker, etc. and is configured to display an operation state and a message by using a letter, an image, and a voice in accordance with an execution of the program in the system control circuit 50. One or more displays 54 are located at easily visually confirmable positions near an operation unit 70 of the camera body 100. The display 54 includes a combination of an LCD, an LED, and a sound generator. Part of the functions of the display 54 is provided in an optical finder 104.

The display contents of the display 54 to be displayed on the LCD etc. contain a single/continuous shooting indication, a self-timer indication, a compression ratio indication, the number of shooting pixels indication, the number of shots indication, the number of remaining shots indication, a shutter speed indication, and a stop value indication. The display contents of the display 54 to be displayed on the LCD etc. also contain an exposure correction indication, and a flash indication, a red eye reduction indication, a macro shooting indication, a buzzer setting indication, an error indication, an information indication of a plurality of numeral digits, indications of attachment states of recording medium 200 and 210, an attachment state indication of the lens unit 300. The display contents of the display 54 to be displayed on the LCD etc. also contain a communication I/F operation indication, a date and time indication, and a connection state indication with an external computer.

The display contents of the display 54 to be displayed on the optical finder 104 contain an on-focus state indication, a photography preparation completion indication, an image stabilization warning indication, a flash charge indication, a flash charging completion indication. The display contents of the display 54 to be displayed on the optical finder 104 also contain a shutter speed indication, a stop value indication, an exposure correction indication, and a recording medium writing operation indication.

The display content of the display 54 to be displayed on the lamp etc. contains, for example, a self-timer informing lamp, which may be commonly used with the AF auxiliary light.

Reference number 56 denotes an nonvolatile memory, such as a flash memory and an EEPROM, which can electrically erase and record information, and store a program, which will be described later.

Reference numeral 60 denotes a mode dial switch, which switches and sets a variety of functional photography modes. These modes include an auto photography mode, a programmed photography mode, a shutter speed priority photography mode, a stop priority photography mode, a manual photography mode, a depth-of-focus priority mode, a portrait photography mode, a landscape photography mode, a close-up photography mode, a sports photography mode, a night view photography mode, and a panoramic photography mode.

Reference numeral 62 denotes a shutter switch (SW1), which turns on when a shutter button (not shown) is half-pressed, and commands a start of an operation, such as the AF process, the AE process, the AWB process, and the EF process.

Reference numeral 64 denotes a shutter switch (SW2), which turns on when a shutter button (not shown) is fully pressed. The shutter switch (SW2) 64 commands a start of an operation of a series of processes, which includes an exposure process, a development process, and a recording process. The exposure process writes as image data a signal read from the image sensor 14 to the memory 30 via the A/D converter 16 and the memory control circuit 22. The development process uses an operation by the image processing circuit 20 or the memory control circuit 22. The recording process reads the image data out of the memory 30, compresses it at the compression/expansion circuit 32, and writes the image data to the recording medium 200 or 201.

Reference numeral 66 denotes a reproduction switch, which commands a start of reading an image captured in the photography mode, from the memory 30 or the recording medium 200 or 210, and displaying it on the image display 28.

Reference numeral 68 denotes a single/continuous shooting switch. Pressing the shutter switch (SW2) 64 results in setting a single shooting mode in which one coma shot is captured, and continuous pressing the shutter switch (SW2) 64 results in setting a continuous shooting mode.

Reference numeral 69 denotes an ISO sensitivity setting switch, which can set an ISO sensitivity by changing gain settings in the image sensor 14 or the image processing circuit 20.

Reference numeral 70 denotes the operation unit that includes a variety of buttons and a touch panel. A variety of buttons includes a menu button, a setting button, a macro button, a page change button for a multi-screen reproduction, a flash setting button, and a single shooting/continuous shooting/self-timer switching button. In addition, the variety of buttons includes a menu movement (+) plus button, a menu movement (−) minus button, a reproduction image movement (+) plus button, a reproduction image movement (−) minus button, an imaging quality selection button, an exposure correction button, and a data and time setting button. In addition, the variety of buttons includes a selecting/switching button configured to select and switch a variety of functions in executing and reproducing a panoramic mode or the like, and an enter/execute button configured to enter and execute a variety of functions in photographing and reproducing a panoramic mode or the like. In addition, the variety of buttons includes an image display on/off switch, which sets turning on and off of the image display 28, and a quick review on/off switch, which sets a quick review function that automatically reproduces captured image data just after the photography. In addition, the variety of buttons includes a compression mode switch that is a switch configured to select a compression ratio of the JPEG compression or to select the RAW mode in which a signal of the image sensor is digitalized as it is and recorded into the recording medium. Moreover, the variety of buttons includes a reproduction switch that can set a variety of functional modes, such as a reproduction mode, a multi-screen reproduction/erase mode, and a PC connection mode. Furthermore, the variety of buttons includes an AF mode setting switch that can set a one-shot AF mode that maintains the on-focus state when the shutter switch (SW1) 62 is pressed, and a servo AF mode that continues the AF operation while the shutter switch (SW1) 62 is pressed.

The above plus and minus buttons provides a smooth selection of the numerical values and functions through a rotary dial switch.

Reference numeral 71 is a power attachment detection switch, which switches from the off state to the on state in response to an external command that instructs a detachment of the battery accessory 500 from the camera body 100, and switches off when the battery accessory 500 is attached. A time period necessary for the entire power shutdown process is secured from when the power attachment detection switch 71 turns on to when the battery accessory 500 is actually ready to detach from the camera body 100.

Thus, the power attachment detection switch 71 of this embodiment detects an attachment or detachment of the power accessory 500. In another embodiment, each of the battery units 506a and 506b in the battery accessory 500 is configured to separately detach from the battery accessory 500, when the battery accessory 500 is attached to the camera body 100. In this case, the power attachment detection switch 71 may detect an attachment or detachment of each battery unit.

Reference numeral 72 denotes a power switch, which can turn on or off the power of the camera body 100. In addition, the power switch 72 can turn on or off the power of accessories, such as the lens unit 300, an external flash unit, and the recording medium 200 and 210.

Reference numeral 80 denotes a power controller, which includes a battery detection circuit, a DC/DC converter, a switching circuit switching an electrified block, etc. The power controller 80 detects whether the battery accessory 500 is attached, a type of the battery unit, and the remaining capacity of the battery unit. Hence, the power attachment detection switch 71 or the power controller 80 can detect an attachment or detachment of the power accessory 500. The power controller 80 controls the DC/DC converter based on the detection result and commands of the system control circuit 50, and supplies a necessary voltage to each component including the recording medium 200 and 210 for a necessary time period.

Reference numerals 84 and 86 denote connectors for connecting the camera body 100 and the battery accessory 500.

The battery accessory 500 includes the battery units 506a and 506b, and a switching circuit 504.

The switching circuit 504 operates as a communication switching circuit that switches the communication line but does not switch the power.

The battery unit 506a includes a battery controller 510a, a temperature detector 512a, a memory 513a, a resistor 514a for discharge current detections, a current detector 516a, and battery cells 518a and 520a. The battery unit 506a also includes a voltage detector 522a. The battery unit 506b includes a battery controller 510b, a temperature detector 512b, a memory 513b, a resistor 514b for discharge current detections, a current detector 516b, and battery cells 518b and 520b The battery unit 506b also includes a voltage detector 522b.

The battery controller 510a is a microcomputer to control the battery unit 506a, and the battery controller 510b is a microcomputer to control the battery unit 506b. The battery controller 510a can communicate with the body 100 and detect an abnormality of the battery unit 506a, and the battery controller 510b can communicate with the body 100 and detect an abnormality of the battery unit 506b. The temperature detector 512a detects a temperature in the battery unit 506a, and the temperature detector 512b detects a temperature in the battery unit 506b. The memory 513a stores the number of shots PN1, and the memory 513b stores the number of shots PN2. Writing to the memories 513a and 513b is performed by a communication (command) from the system control circuit 50 to the battery controllers 510a and 510b. The current detectors 516a and 516b detect a discharge current. The voltage detector 522a detects voltages of the battery cells 518a and 520a, and the voltage detector 522b detects voltages of the battery cells 518b and 520b.

Reference numeral 90 denotes an interface for the recording medium 200, and reference numeral 94 denotes an interface for the recording medium 210. Reference numeral 92 denotes a connector for connecting the recording medium 200 and the camera body 100, and reference numeral 96 denotes a connector for connecting the recording medium 210 and the camera body 100. Reference numeral 98 is a recording medium attachment detector configured to detect whether the recording medium 200 or 210 is attached to the connector 92 or 96.

While this embodiment provides two sets of interfaces and connectors used to attach the recording medium, the number of sets of the interface and the connector used to attach the recording medium may be singular or plural. They may combine the interfaces and connectors of different standards. In addition, the interface and the connector may be conform to a standard, such as a PCMCIA card or a compact flash ("CF") card.

Reference numeral 104 denotes the optical finder, which guides a ray incident upon the photography lens 310 by a single-lens flex manner via the aperture 312, the lens mounts 306 and 106, the mirror 130, and a mirror 132, and forms and displays an optical image. This configuration provides shooting with the optical finder 104 and without an electronic finder function using the image display 28. The optical finder 104 has part of the functions of the display 54, such as an on-focus indication, an image stabilization warning indication, a flash charge indication, a shutter speed indication, a stop value indication, and an exposure correction indication.

Reference numeral 110 denotes a communication unit, and includes a variety of communication functions, such as RS232C, USB, IEE1394, P1284, SCSI, a modem, a LAN, and a radio communication. Reference numeral 112 denotes a connector used to connect the camera body 100 to another unit via the communication unit 110 or an antenna for radio communications.

Reference numeral 120 denotes an interface configured to connect the camera body 100 to the lens unit 300. Reference numeral 122 denotes a connector that electrically connects the camera body 100 to the lens unit 300. Reference numeral 124 denotes a lens attachment detector configured to detect whether the lens unit 300 is attached to the lens mount 106 and/or the connector 122.

The connector 122 communicates a control signal, a state signal, and a data signal between the camera body 100 and the lens unit 300, and serves to supply the currents for a variety of voltages. The connector 122 may serves to provide an optical communication, a voice communication, etc., rather than an electric communication.

Reference numerals 130 and 132 denote the mirrors, which guide a ray incident upon the photography lens 310 to the optical finder 104 by the single-lens reflex manner. The mirror 130 may have either a quick return mirror structure or a half-mirror structure.

Reference numeral 200 denotes the recording medium, such as a memory card or a hard disc drive. The recording medium 200 includes a memory 202, such as a semiconductor memory or a magnetic disc, an interface 204 for the camera body 100, and a connector 206 for connecting the recording medium 200 and the camera body 100. Reference numeral 210 denotes the recording medium, such as a memory card or a hard disc drive, similar to the recording medium 200. The recording medium 210 includes a memory 212, such as a semiconductor memory or a magnetic disc, an interface 214 for the camera body 100, and a connector 216 for connecting the recording medium 210 and the camera body 100.

Reference numeral 300 denotes the lens unit. The lens unit 300 is an exchange lens type of a lens unit. Reference numeral 306 denotes the lens mount that mechanically couples the lens unit 300 with the camera body 100. The lens mount 306 has a variety of functions used to electrically connect the lens unit 300 to the camera body 100.

Reference numeral 310 denotes the photography lens, and reference numeral 312 denotes the aperture. Reference numeral 320 is an interface that connects the lens unit 300 to the camera body 100. Reference numeral 322 denotes a connector, which electrically connects the lens unit 300 to the camera body 100.

The connector 322 serves to communicate a control signal, a state signal, a data signal, etc., between the camera body 100 and the lens unit 300, and receive or supply a variety of currents. The connector 322 may serve to provide an optical communication, a voice communication etc., rather than an electric communication.

Reference numeral 340 is the aperture controller configured to control the aperture 312 in association with the shutter controller 40 configured to control the shutter 12, based on the photometric information from the photometry controller 46. Reference numeral 342 denotes the focus measurement controller configured to control focusing of the photography lens 310. Reference numeral 344 denotes a zoom controller configured to control zooming of the photography lens 310. Reference numeral 350 denotes a lens control circuit configured to control the entire lens unit 300. The lens control circuit 350 has a memory function that stores a constant, a variable, and a program for operations. The lens control circuit 350 serves as a nonvolatile memory configured to hold ID information, such as a number peculiar to the lens unit 300, control information, functional information, such as a release stop value, a minimum stop value, and a focal length, and respective present and past setting values.

Figure 2:
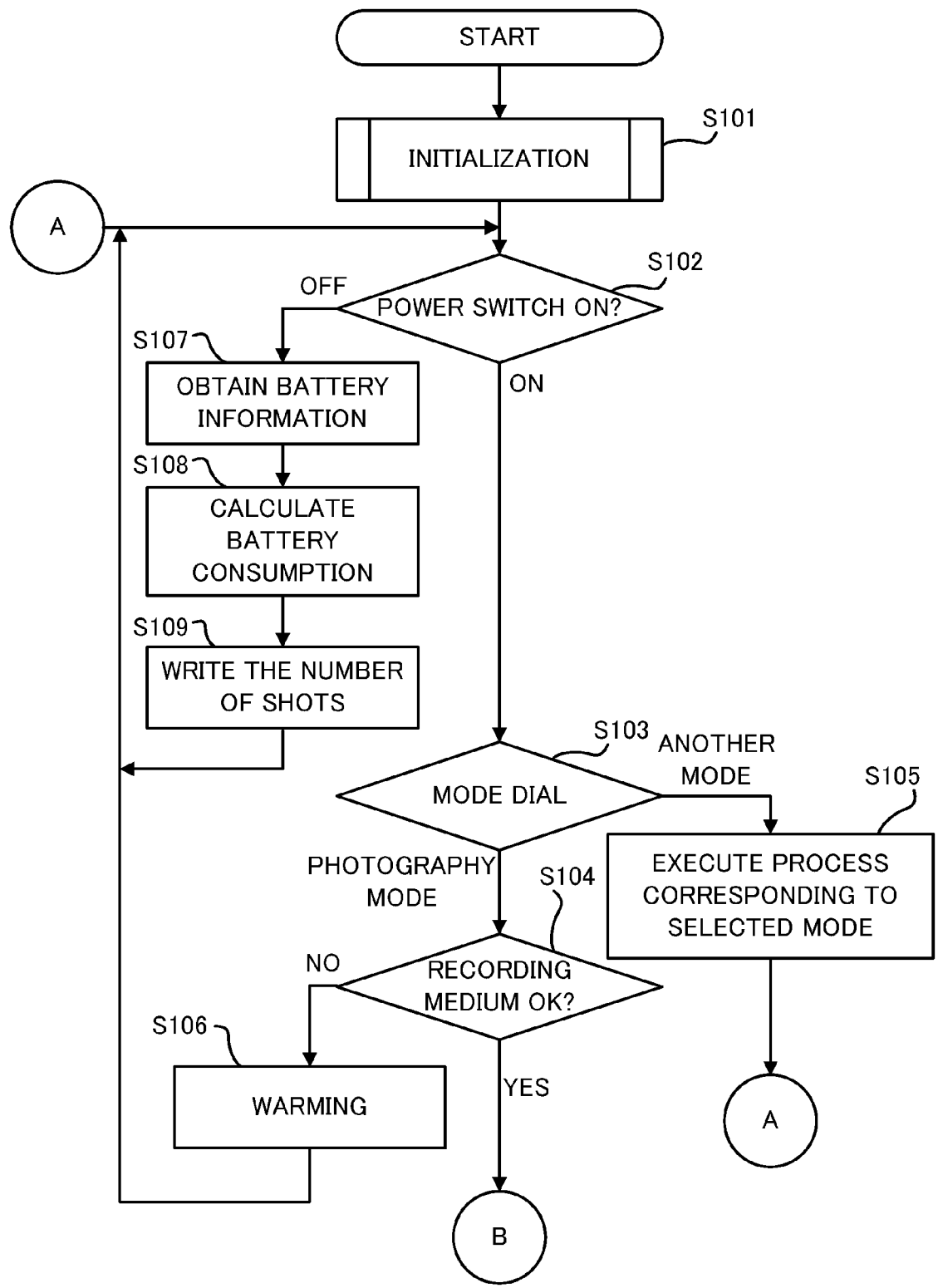
FIG. 2 is a flowchart showing a process performed by the image capture apparatus shown in FIG. 1.
Figure 3:
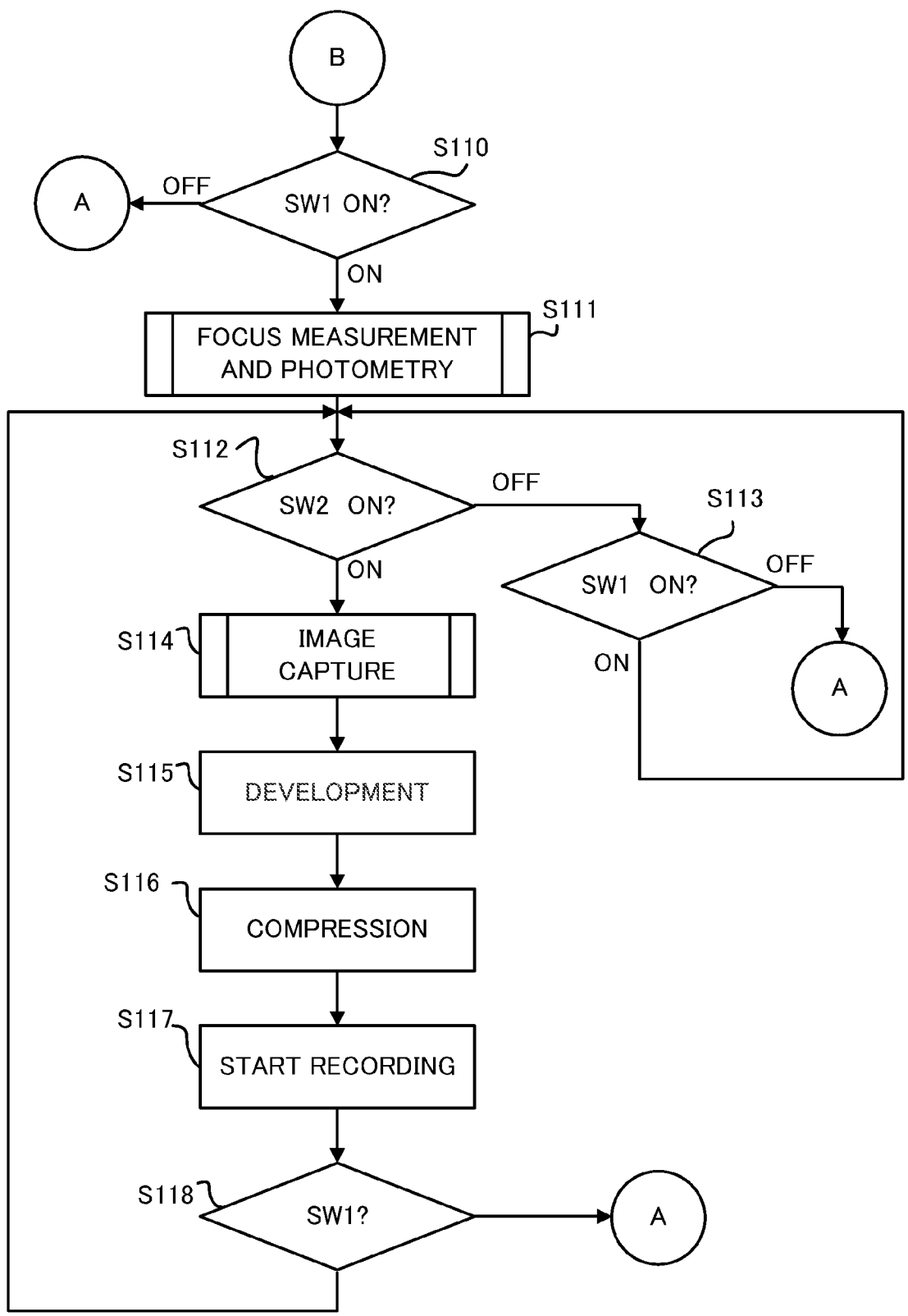
FIG. 3 is a flowchart showing a process performed by the image capture apparatus shown in FIG. 1.
Figure 4:
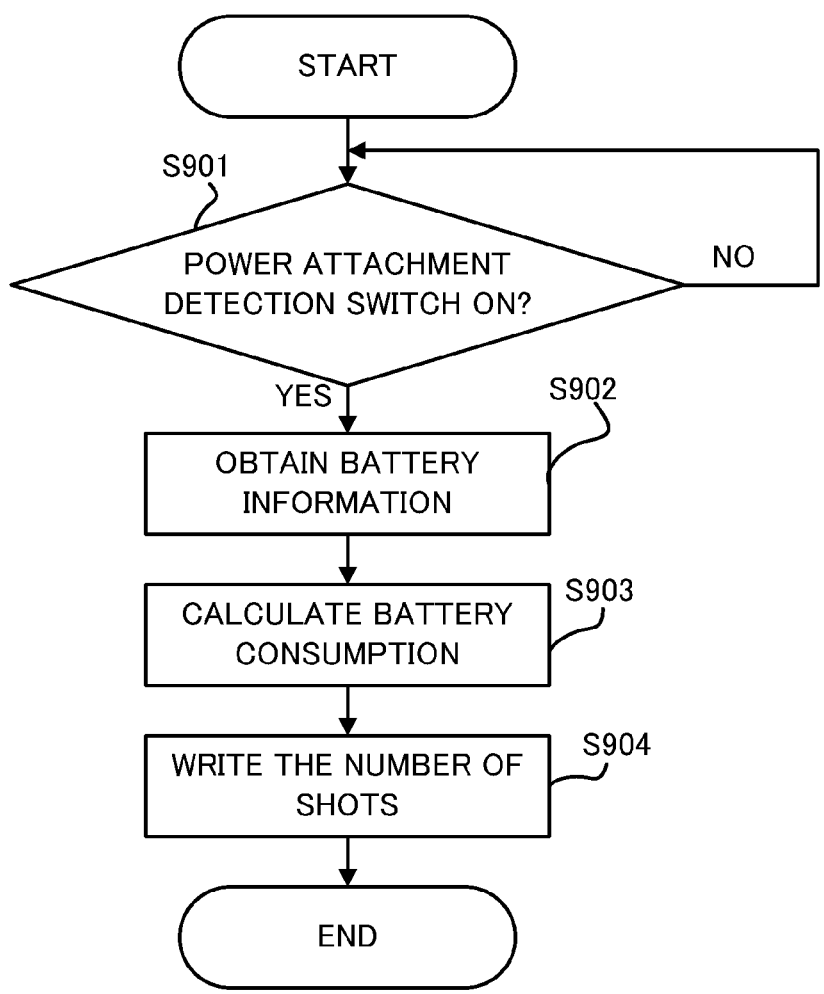
FIG. 4 is a flowchart showing a process performed by the image capture apparatus shown in FIG. 1.

A description will now be given of an operation of the electronic camera shown in FIG. 1. FIGS. 2 to 4 are flowcharts showing processes performed by the camera body 100. A program for the processes performed by the camera body 100 is stored in a recording medium, such as the nonvolatile memory 56, and loaded in the memory 52 and executed by the CPU in the system control circuit 50.

When the power of the camera body 100 is turned on, the system control circuit 50 initializes the flag, the control variable, etc., and initializes each part in the camera body 100 (S101). In S101, the system control circuit 50 obtains a remaining capacity RS1 from the battery unit 506*a*, and obtains a remaining capacity RS2 from the battery unit 506*b*. The remaining capacity RS1 represents the remaining capacity of the battery unit 506*a*. The remaining capacity RS2 represents the remaining capacity of the battery unit 506*b*. When the system control circuit 50 obtains the remaining capacities RS1 and RS2, the system control circuit 50 communicates with the battery controllers 510*a* and 510*b* through an interface (I/F) unit 82. In S101, the system control circuit 50 resets the number of shots PN to 0. The number of shots PN represents the number of shots counted by the system control circuit 50. The number of shots PN is stored in an internal memory of the system control circuit 50, the memory 52 or the nonvolatile memory 56. After the initialization is performed, the system control circuit 50 determines, based on the position of the power switch 72, whether the power switch 72 is set to the power off position (S102).

When the power switch 72 is set to the power off position (YES in S102), the system control circuit 50 obtains the remaining capacity RS1 from the battery unit 506*a*, and obtains the remaining capacity RS2 from the battery unit 506*b* (S107).

Next, the system control circuit 50 calculates battery consumptions US1 and US2 based on Equation 1 (S108). In Equation 1, the battery consumption US1 represents a consumption of the battery unit 506*a*, and the battery consumption US2 represents a consumption of the battery unit 506*b*. In Equation 1, $RS1_{PR}$ represents the remaining capacity RS1 that is obtained from the battery unit 506*a* when S101 shown in FIG. 2 is being performed, and $RS2_{PR}$ represents the remaining capacity RS2 that is obtained from the battery unit 506*b* when S101 shown in FIG. 2 is being performed. In Equation 1, $RS1_{PO}$ represents the remaining capacity RS1 that is obtained from the battery unit 506*a* when S107 shown in FIG. 2 is being performed, and $RS2_{PO}$ represents the remaining capacity RS2 that is obtained from the battery unit 506*b* when S107 shown in FIG. 2 is being performed. Table 1 shows an example of $RS1_{PR}$, $RS1_{PO}$, $RS2_{PR}$ and $RS2_{PO}$. Assume that the number of shots is 100, the remaining capacity $RS1_{PR}$ is, for example, 1850 mAh, and the remaining capacity $RS2_{PR}$ is, for example, 1450 mAh. Assume that the number of shots is 100, the remaining capacity $RS1_{PO}$ is, for example, 1590 mAh, and the remaining capacity $RS2_{PO}$ is, for example, 1230 mAh. In S108 shown in FIG. 2, the system control circuit 50 serves as a calculation unit that calculates the consumptions of the battery units 506*a* and 506*b*.

$$US1 = RS1_{PR} - RS1_{PO} = 280 \text{ mAh}$$

$$US2 = RS2_{PR} - RS2_{PO} = 220 \text{ mAh} \quad \text{EQUATION 1}$$

TABLE 1

|  | Before capturing image | After capturing image |
| --- | --- | --- |
| Remaining capacity RS1 of Battery unit 506a | $RS1_{PR}$ = 1850 mAh | $RS1_{PO}$ = 1590 mAh |

TABLE 1-continued

|  | Before capturing image | After capturing image |
| --- | --- | --- |
| Remaining capacity RS2 of Battery unit 506b | $RS2_{PR}$ = 1450 mAh | $RS2_{PO}$ = 1230 mAh |

The number of shots PN is divided into PN1 and PN2 based on Equation 2. In Equation 2, PN1 represents the number of shots to which the battery unit 506*a* contributes, and PN2 represents the number of shots to which the battery unit 506*b* contributes. In Equation 2, US1+US2 represents a sum of the consumptions of the battery units 506*a* and 506*b*. In Equation 2, US1/(US1+US2) represents a ratio of the consumption of battery unit 506*a* to the sum of the consumptions of the battery units 506*a* and 506*b*. In Equation 2, US2/(US1+US2) represents a ratio of the consumption of battery unit 506*b* to the sum of the consumptions of battery units 506*a* and 506*b*. When the system control circuit 50 calculates the PN1, the system control circuit 50 allots the PN1 to the battery unit 506*a* and controls the battery unit 506*a* to write the PN1 to the memory 513*a* (S109). When the system control circuit 50 calculates the PN2, the system control circuit 50 allots the PN2 to the battery unit 506*b* and controls the battery unit 506*b* to write the PN2 to the memory 513*b* (S109). In S109 shown in FIG. 2, the system control circuit 50 serves as a calculation unit that divides the number of shots the PN into the PN1 and the PN2 based on the consumptions of the battery units 506*a* and 506*b*. In S109 shown in FIG. 2, the system control circuit 50 also serves as a control unit that controls the battery unit 506*a* to write the PN1 to the memory 513*a* and controls the battery unit 506*b* to write the PN2 to the memory 513*b*.

$$PN1 = PN \times US1/(US1+US2) = 100 \times 280/(280+220) = 56$$

$$PN2 = PN \times US2/(US1+US2) = 100 \times 220/(280+220) = 44 \quad \text{EQUATION 2}$$

For example, when the number of shots PN is 100, the system control circuit 50 writes 56 (shots) to the memory 513*a* of the battery unit 506*a* and writes 44 (shots) to the memory 513*b* of the battery unit 506*b* (S109).

On the other hand, when the power switch 72 is set to the power on position (ON in S102), the system control circuit 50 determines, based on the position of the mode dial switch 60, whether the mode dial switch 60 is set to the photography mode (S103).

When the mode dial switch 60 is set to another mode (ANOTHER MODE in S103), the system control circuit 50 executes a process corresponding to the selected mode (S105), and the flow returns to S102.

On the other hand, when the mode dial switch 60 is set to the photography mode (PHOTOGRAPHY MODE in S103), the system control circuit 50 determines whether the recording medium 200 or 201 is attached, and obtains the control information of the image data recorded in the recording medium 200 or 210. The system control circuit 50 further determines whether the operational state of the recording medium 200 or 210 is problematic to the operation of the camera body 100, in particular, the recording or reproduction operations of the image data to the recording medium (S104).

When the recording medium is determined to be problematic (NO in S104), the system control circuit 50 provides a predetermined warning by displaying an image on the display 54 or by outputting a voice (S106), and then the flow returns to S102.

When the recording medium is determined to be non-problematic (YES in S104), the system control circuit 50 displays a variety of setting states of the camera body 100 using the display 54. When an image display switch of the image display 28 turns on, a variety of setting states of the camera body 100 may be displayed using the image display 28.

As shown in FIG. 3, the system control circuit 50 determines whether the shutter switch (SW1) 62 is pressed (S110), and the flow returns to S102 when the shutter switch (SW1) 62 is not pressed (OFF in S110). On the other hand, when the shutter switch (SW1) 62 is pressed (ON in S110), the system control circuit 50 performs the focus measurement process to adjust the focus of the photography lens 310 onto an object, and performs the photometry process to determine the stop value and the shutter speed (S111). If necessary, the photometry process sets the flash.

Next, the system control system 50 determines whether the shutter switch (SW2) 64 is pressed (S112). When the shutter switch (SW2) 64 is not pressed (OFF in S112), the system control system 50 determines whether shutter switch (SW1) 62 is released (S113). The process of S112 and S113 is repeated until the shutter switch (SW1) 62 is released or the shutter switch (SW2) 64 is pressed. When the shutter switch (SW1) 62 is released in S113 (OFF in S113), the flow moves to S102. When the shutter switch (SW2) 64 is pressed (ON in S112), the flow moves to the image capture process (S114). In image capture process, image data captured by the camera body 100 is written to a predetermined area in the memory 30 (S114).

Next, the system control circuit 50 reads the captured image data from the predetermined area in the memory 30. Next, the system control circuit 50 performs a variety of development processes including an AWB process, a gamma conversion process, and a color conversion process, by using operation results stored in the internal memory of the system control circuit 50 or the memory 52 (S115). After the captured image data read from the predetermined area is performed in accordance with the variety of development processes, the system control circuit 50 writes the captured image data to the predetermined area.

The system control circuit 50 reads the captured image data from the predetermined area in the memory 30, and performs an image compression process corresponding to the set mode using the compression/expansion circuit 32 (S116). In addition, the system control circuit 50 writes the compressed image data to a buffer area in the memory 30.

Next, the system control circuit 50 reads the compressed image data from the buffer area in the memory 30. The system control circuit 50 starts a recording process that writes the compressed image data read from the buffer area to the recording medium 200 or 210, via the interface 90 or 94, and the connector 92 or 96 (S117) After the compressed image data is stored in the recording medium 200 or 210, the system control circuit 50 adds 1 to the number of shots PN.

In order to indicate that writing is processing while the image data is being written to the recording medium 200 or 201, the recording medium writing operation is displayed, such as littering of the LED, on the display 54.

Next, the system control circuit 50 determines whether the shutter switch (SW1) 62 is pressed (S118). When the shutter switch (SW1) 62 is released (OFF in S118), the flow returns to S102. On the other hand, when the shutter switch (SW1) 62 is pressed (ON in S118), the flow moves to S112.

Referring now to the flowchart of FIG. 4, a description will now be given of a process when the battery accessory 500 is detached from the electronic camera. The system control circuit 50 determines whether the power attachment detection switch 71 turns on (S901). As described above, the power attachment switch 71 switches from the off state to the on state in response to the external command that instructs the detachment of the battery accessory 500 from the camera body 100. A time period necessary for the entire power shutdown process is secured from when the power attachment detection switch 71 turns on to when the battery accessory 500 is actually ready to detach from the camera body 100. When the power attachment detection switch 71 turns on (YES in S901), the system control circuit 50 obtains the remaining capacity $RS1_{PO}$ from the battery unit 506a, and obtains the remaining capacity $RS2_{PO}$ from the battery unit 506b (S902). Next, the system control circuit 50 calculates the battery consumptions US1 and US2 based on Equation 1 (S903). Then, the system control circuit 50 calculates the PN1 and PN2 based on Equation 2, controls the battery unit 506a to writes the PN1 to the memory 513a, and controls the battery unit 506b to writes the PN2 to the memory 513b (S904). The process performed in S902 to S904 shown in FIG. 4 are same as that of S107 to S109 shown in FIG. 2, and therefore a detail description thereof will be omitted. Finally, the power shutdown process is performed.

Figure 5:
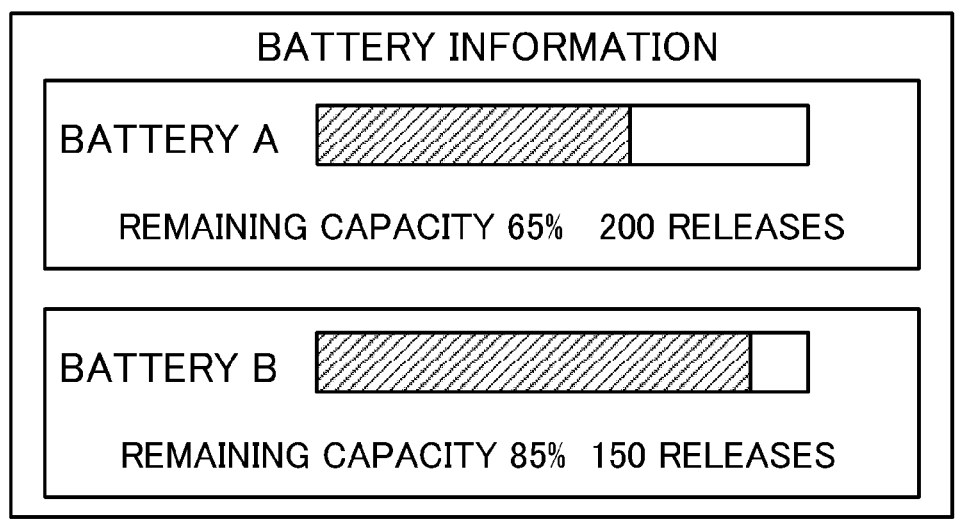
FIG. 5 shows one example of battery information that displays on an image display of the image capture apparatus shown in FIG. 1.
Figure 6:
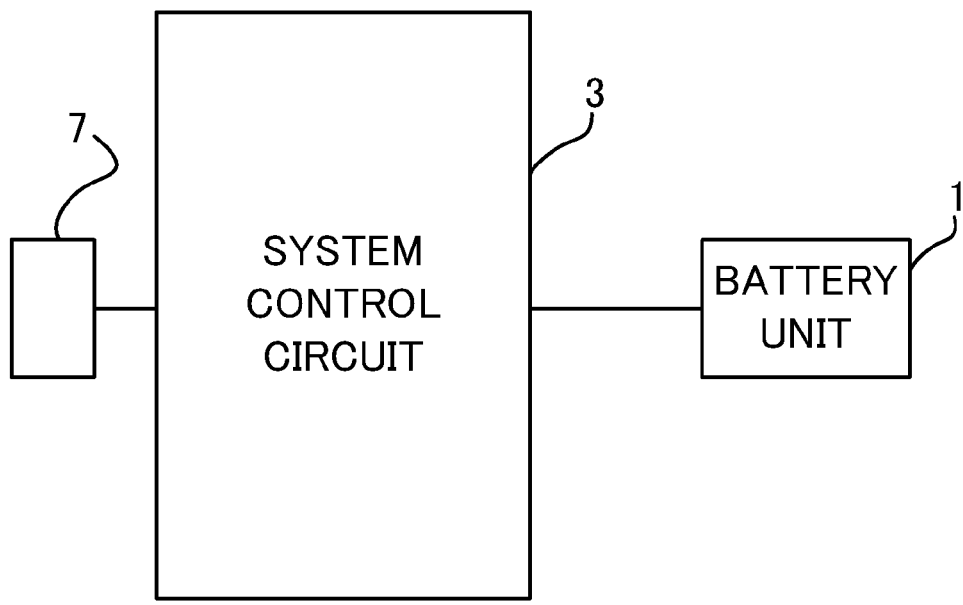
FIG. 6 is a block diagram of a conventional power system.
Figure 7:
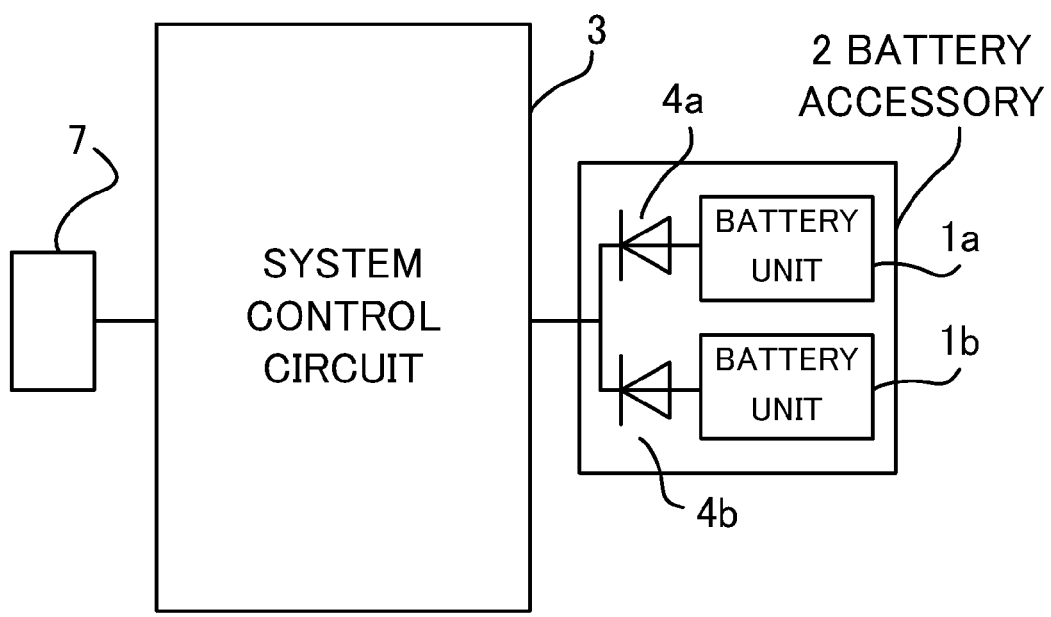
FIG. 7 is a block diagram of another conventional power system.

FIG. 5 shows one example of battery information that displays on the image display 28. The battery A represents the battery unit 506a, and the battery B represents the battery unit 506b. In FIG. 5, "65%" represents the remaining capacity of the battery units 506a, and "85%" represents the remaining capacity of the battery units 506b. In FIG. 5, "200" represents the number of shots PN1 allotted to the battery units 506a, and "150" represents the number of shots PN2 allotted to the battery units 506b While the present invention has been described with reference to the disclosed exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-120886, filed May 7, 2008, which is hereby incorporated by reference herein in its entirety.

What is claimed is:

1. An image capture apparatus, comprising:
an image capture unit that captures an image; and
a processor that (a) controls the image capture apparatus to store image data corresponding to the captured image in a recording medium, (b) calculates a first battery consumption, (c) calculates a second battery consumption, (d) calculates PN1 and PN2 based on PN, the first battery consumption, and the second battery consumption, (e) controls the image capture apparatus to store the PN1 to a first memory included in a first battery unit, and (f) controls the image capture apparatus to store the PN2 to a second memory included in a second battery unit,
wherein the PN represents a number of shots already taken, the PN1 represents a first number, the PN2 represents a second number, the first battery consumption represents an already used capacity of the first battery unit, and the second battery consumption represents an already used capacity of the second battery unit.

2. The image capture apparatus according to claim 1, wherein the first battery consumption is calculated based on a remaining capacity of the first battery unit, and the second battery consumption is calculated based on a remaining capacity of the second battery unit.

3. The image capture apparatus according to claim 1, further comprising:
a connector that is connected to an accessory device including the first battery unit and the second battery unit.

4. The image capture apparatus according to claim 1, further comprising:
a display unit that displays first information representing the PN1 stored in the first memory of the first battery unit, and displays second information representing the PN2 stored in the second memory of the second battery unit.

5. The image capture apparatus according to claim 4, wherein the display unit displays third information representing a remaining capacity of the first battery unit if the first information is displayed on the display unit, and
wherein the display unit displays fourth information representing a remaining capacity of the second battery unit if the second information is displayed on the display unit.

6. The image capture apparatus according to claim 1, wherein the image capture apparatus includes an electronic camera.

7. The image capture apparatus according to claim 1, wherein the image capture apparatus includes a digital camera.

8. The image capture apparatus according to claim 1, wherein the PN1 and the PN2 are calculated based on the PN and a ratio of the first battery consumption to the second battery consumption.

9. A method comprising:
controlling an image capture apparatus to capture an image;
controlling the image capture apparatus to store image data corresponding to the captured image in a recording medium;
calculating a first battery consumption;
calculating a second battery consumption;
calculating PN1 and PN2 based on PN, the first battery consumption, and the second battery consumption;
controlling the image capture apparatus to store the PN1 to a first memory included in a first battery unit; and
controlling the image capture apparatus to store the PN2 to a second memory included in a second battery unit,
wherein the PN represents a number of shots already taken, the PN1 represents a first number, the PN2 represents a second number, the first battery consumption represents an already used capacity of the first battery unit, and the second battery consumption represents an already used capacity of the second battery unit.

10. The method according to claim 9, wherein the first battery consumption is calculated based on a remaining capacity of the first battery unit, and the second battery consumption is calculated based on a remaining capacity of the second battery unit.

11. The method according to claim 9, wherein the image capture apparatus includes a connector that is connected to an accessory device including the first battery unit and the second battery unit.

12. The method according to claim 9, further comprising:
controlling a display unit to display first information representing the PN1 stored in the first memory of the first battery unit; and
controlling the display unit to display second information representing the PN2 stored in the second memory of the second battery unit,
wherein the image capture apparatus includes the display unit.

13. The method according to claim 12, wherein third information representing a remaining capacity of the first battery unit is also displayed on the display unit if the first information is displayed on the display unit, and
wherein fourth information representing a remaining capacity of the second battery unit is also displayed on the display unit if the second information is displayed on the display unit.

14. The method according to claim 9, wherein the image capture apparatus includes an electronic camera.

15. The method according to claim 9, wherein the image capture apparatus includes a digital camera.

16. The method according to claim 9, wherein the PN1 and the PN2 are calculated based on the PN and a ratio of the first battery consumption to the second battery consumption.

* * * * *